United States Patent
Kim et al.

(10) Patent No.: US 8,768,537 B2
(45) Date of Patent: Jul. 1, 2014

(54) SYSTEM AND METHOD FOR UPDATING VEHICLE INFORMATION USING WIRELESS ACCESS POINT CONNECTED TO TELEMATICS SERVER

(75) Inventors: Sung Woo Kim, Seoul (KR); Ji Hyun Lim, Gyeonggi-do (KR); Sung Woo Park, Seoul (KR); Geum Dan Jin, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 418 days.

(21) Appl. No.: 13/086,561

(22) Filed: Apr. 14, 2011

(65) Prior Publication Data

US 2012/0143402 A1 Jun. 7, 2012

(30) Foreign Application Priority Data

Dec. 6, 2010 (KR) .......................... 10-2010-0123839

(51) Int. Cl.
- *G06F 17/00* (2006.01)
- *G06F 15/16* (2006.01)
- *H04L 29/06* (2006.01)
- *H04L 29/08* (2006.01)

(52) U.S. Cl.
CPC .................. *H04L 65/60* (2013.01); *H04L 67/02* (2013.01); *H04L 67/06* (2013.01)
USPC .............................................. 701/2; 709/219

(58) Field of Classification Search
USPC ................ 701/2, 517, 1, 412, 469, 117, 29.3, 701/29.1, 31.4, 32.4, 118; 709/219, 246, 709/238, 249, 218, 221, 222; 707/999.1, 707/999.101, E17.009; 713/176; 340/995.12, 995.13, 425.5, 531, 691.6, 340/693.9; 455/569.2, 466

See application file for complete search history.

(56) References Cited

U.S. PATENT DOCUMENTS

| | | | |
|---|---|---|---|
| 6,415,331 B1 * | 7/2002 | Ariga | 709/246 |
| 7,233,814 B2 | 6/2007 | Wissinger et al. | |
| 2007/0135990 A1 | 6/2007 | Seymour et al. | |
| 2008/0114539 A1 * | 5/2008 | Lim | 701/208 |
| 2009/0177677 A1 * | 7/2009 | Mikusiak | 707/101 |
| 2009/0316671 A1 * | 12/2009 | Rolf et al. | 370/338 |
| 2010/0211284 A1 * | 8/2010 | Rothschild | 701/93 |
| 2010/0299728 A1 * | 11/2010 | Haff et al. | 726/5 |
| 2011/0238781 A1 * | 9/2011 | Okun et al. | 709/217 |
| 2012/0030470 A1 * | 2/2012 | Jdanov et al. | 713/176 |

FOREIGN PATENT DOCUMENTS

| | | |
|---|---|---|
| JP | 2007043391 A | 2/2007 |
| KR | 10-2008-0082194 | 9/2008 |
| KR | 10-2009-0041484 | 4/2009 |

* cited by examiner

*Primary Examiner* — Marthe Marc-Coleman
(74) *Attorney, Agent, or Firm* — Edwards Wildman Palmer LLP; Peter F. Corless

(57) ABSTRACT

A technique for updating vehicle information using a wireless access point connected to a telematics server is described. More specifically, the system includes a wireless communication unit configured to connect to the wireless access point through, e.g., Wi-Fi network, to automatically receive an update data container(s), when the update data container(s) regarding the vehicle information is present in the telematics server; a control unit configured to store the update data container(s) received through the wireless communication unit and control the vehicle information and one or more devices corresponding to the vehicle information; and an update unit configured to update the vehicle information by using the update data container(s).

12 Claims, 2 Drawing Sheets

SYSTEM AND METHOD FOR UPDATING VEHICLE INFORMATION USING WIRELESS ACCESS POINT CONNECTED TO TELEMATICS SERVER

CROSS-REFERENCES TO RELATED APPLICATIONS

Priority to Korean Patent Application Number 10-2010-0123839, filed on Dec. 6, 2010, which is incorporated herein by reference in its entirety, is claimed.

BACKGROUND OF THE INVENTION

1. Field of the Invention

The present invention relates to a system and a method of updating vehicle information, and more particularly, to a system and a method of updating vehicle information for use in a vehicle by using a wireless access point connected to a telematics server.

2. Description of the Related Art

Recently telematics service for vehicles, such as "MOZEN" telematics service, has become widely available. As a result, the automotive industry has been able to offer various services can these type telematics servers. For example, a vehicle user can store a file provided by the telematics server through a universal serial bus (USB) to update vehicle information by, for example, a USB terminal and a USB interface within the vehicle. Alternatively, a communication system provided in the vehicle can be used to access to the telematics server via some form of high speed downlink packet access (HSDPA).

However, updating the vehicle information using the above described method is inconvenient and tedious because a computer and an USB device are needed each time. Also, HSDPA is disadvantageous in that HSDPA has low speeds of 1.5 Mbs or less and has a sometimes prohibitively expensive service charge associated with its use.

SUMMARY OF THE INVENTION

The present invention provides a method and a system for updating vehicle information by connecting to a telematics server via a wireless access point to receive one or more update data containers, e.g., files, for updating the vehicle information, when the update file is present or an update request is generated.

According to one aspect of the present invention, the system comprises a wireless communication unit configured to connect to the wireless access point via, e.g., Wi-Fi, to automatically receive an update file/data container, when an update file is present in the telematics server. The received update file is then stored by a control unit. The control unit is additionally configured to control vehicle information and one or more de vices corresponding to the vehicle information. Once the update has been stored by the control unit an update unit updates the vehicle information by using the received update file.

According to another aspect of the present invention, provided is a method of updating vehicle information using a wireless access point connected to a telematics server. More specifically, the method initially connects to the wireless access point through, e.g., a Wi-Fi connection, to automatically receive an update file, when the update file regarding the vehicle information is present in the telematics server. The received update file is then stored by a control unit and used by an update unit to update the vehicle information associated with the update file.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like. The present systems will be particularly useful with a wide variety of motor vehicles.

Figure 1:
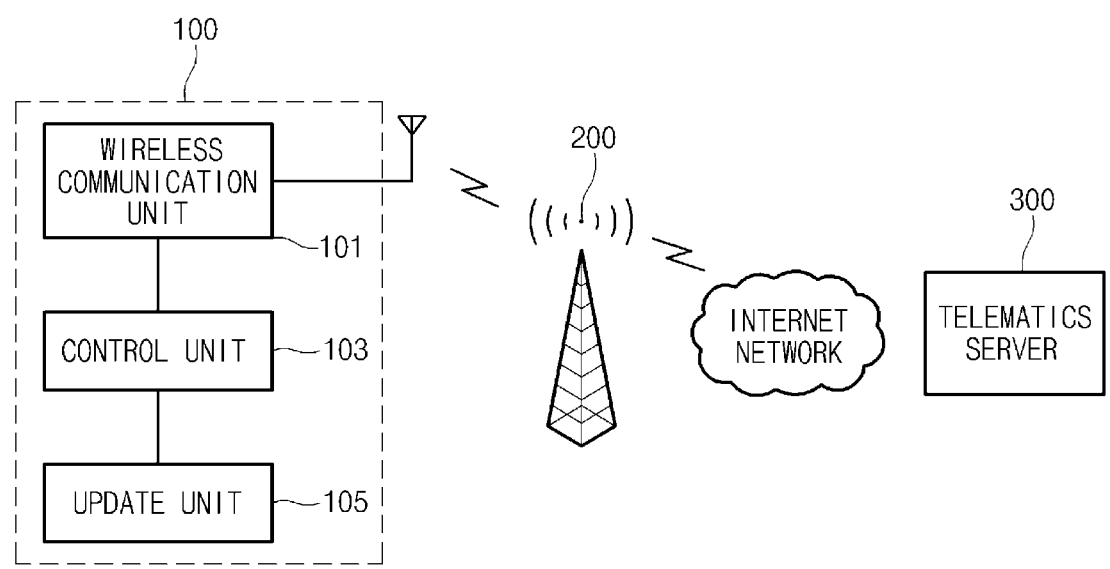
FIG. 1 is a view illustrating a configuration of a system for updating vehicle information according to an exemplary embodiment of the present invention.

FIG. 1 is a view illustrating a configuration of a system for updating vehicle information according to an exemplary embodiment of the present invention.

As shown in FIG. 1, a vehicle information updating system 100 is configured to connect to a telematics server 300 via a wireless access point 200 and the wireless access point 200 is connected to the telematics server 300 via, e.g., an internet network. The telematics server 300 is capable of providing, for example, location information, driving information, and vehicle maintenance information in the form of one or more data containers, e.g., update files, which can benefit the vehicles overall functionality. More specifically, one example of an exemplary telematics server 300 is "MOZEN" telematics server.

The vehicle information updating system 100, which is provided in a vehicle, includes, particularly, a wireless communication unit 101, a control unit 103, an update unit 105, and a user input unit 107.

The wireless communication unit 101 searches for an optimal wireless access point accessible in the surrounding area by the vehicle information updating system 100, connects to the optimal wireless access point 200 located by search, and transmits and receives data to/from the telematics server 300. For example, the wireless communication unit 101 may be connected to the located wireless access point 200 through a Wi-Fi network. By doing so the wireless communication unit 1010 can receive one or more vehicle information update files from the telematics server 300 or transmit a certain request signal to the telematics server 300 for those files. When the vehicle information update file is present in the telematics server 300, the wireless communication unit 101 may be configured to automatically receive the vehicle information update file or do so upon confirmation by a user. Furthermore, in some embodiment, the wireless communication unit 101 may be embodied as a Wi-Fi box.

The control unit 103 controls vehicle information provided to the vehicle and one or more corresponding devices to which the vehicle information is directed. Here, the vehicle information provided to the vehicle may include, e.g., map data, traffic information, and traffic surveillance camera information that are required for navigation, vehicle maintenance information including breakdown diagnostics, and/or software and firmware for updating an operating system of an in-vehicle device.

Accordingly, when an update file is transmitted to the vehicle from the telematics server 300, the control unit 103 stores the update file once it has been transmitted from the wireless communication unit 101. When an error occurs during transmission of the update file, the control unit 103 may be configured to automatically request that the telematics server resume transmission of the update file from the point at which the error occurred or may optionally request the update file be retransmitted all together.

In some embodiments of the present invention, the control unit 103 may optionally identify the vehicle information to be updated and send a request for an associated update file regarding the identified vehicle information to the telematics server 300 via the wireless communication unit 101. Also, the control unit 103 can authenticate whether a connection between the wireless communication unit 101 and the wireless access point 200 is a valid connection or not. The update unit 105 then updates the vehicle information by using the update file stored in the control unit 103 once update file is received at the update unit from the control unit 103.

Figure 2:
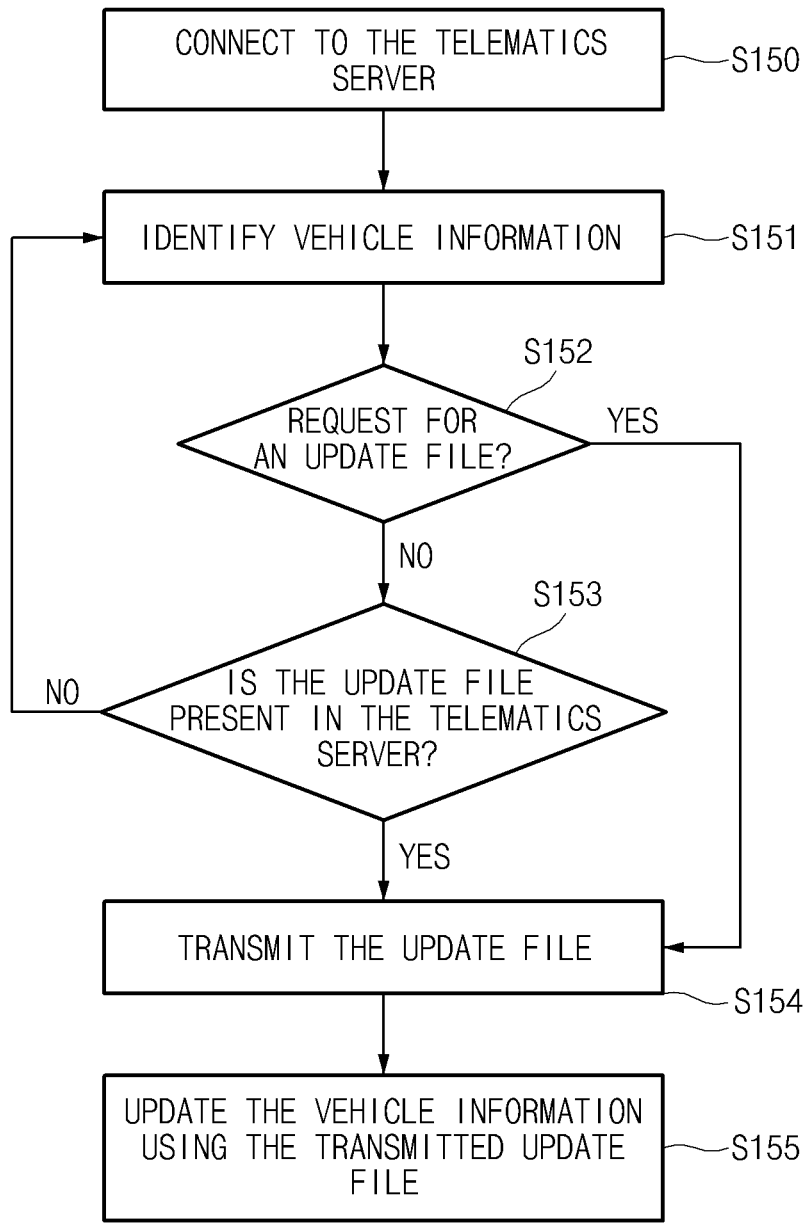
FIG. 2 is a flowchart illustrating a method of updating vehicle information according to an exemplary embodiment of the present invention.

FIG. 2 is a flowchart illustrating a method of updating vehicle information according to an exemplary embodiment of the present invention.

As shown in FIG. 2, the wireless communication unit 101 initially searches for an optimal wireless access point 200 which accessible by the wireless communication unit 101 to connect to the telematics server 300 (S150). Here, the optimal wireless access point 200 can be any wireless access point that is in a nearest location or has strongest signal strength.

Next, the control unit 103 identifies whether there exists the vehicle information that needs to be updated (S151). If the vehicle information to be updated exists, the control unit 103 sends a request for an associated update file to the telematics server 300 via the wireless communication unit 101 (S152).

If no vehicle information needs to be updated, the control unit 103 determines whether the telematics server 300 connected thereto has an update file regarding the vehicle information controlled by the control unit 103 (S153).

Accordingly, when the control unit 103 requests the update file to the telematics server 300 or the update file regarding the vehicle information is present in the telematics server 300, the wireless communication unit 101 receives the update file from the telematics server 300 (S154), and the update unit 105 updates the vehicle information by using the received update file (S155).

Advantageously, the present invention provides a wireless access point to be used for connecting to the telematics server so that an update file can be downloaded at much higher speeds via wireless internet, which in some cases is free. Also, the vehicle information can be automatically updated, without requiring a separate device such as a universal serial bus (USB).

In addition, the present invention may also be implemented as a computer readable media stored in a recording medium that is readable and executed by a processor. The recording medium readable by the processor can include, for example, a ROM, a RAM, a CD-Rom, a magneto-optical disk, a floppy disk or an optical data storage device.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A system for updating vehicle information using a wireless access point connected to a telematics server, the system comprising:
   a wireless communication unit configured to connect to the wireless access point via a Wi-Fi network to automatically receive an update file, when the update file regarding the vehicle information is present on the telematics server;
   a control unit configured to store the update file received through the wireless communication unit and control the vehicle information and one or more devices corresponding to the vehicle information; and
   an update unit configured to update the vehicle information by using the update file,
   wherein when an error occurs during transmission of the update file, the control unit is configured to send a request to the telematics server to resume transmission of the update file from the point at which the error occurred.

2. The system according to claim 1, wherein the wireless communication unit is configured to search the wireless access point located in a surrounding area.

3. The system according to claim 1, wherein the control unit identifies the vehicle information that needs to be updated and requests for the update file regarding the identified vehicle information.

4. The system according to claim 1, wherein the vehicle information includes at least one selected from a group consisting of map data, traffic information, and traffic surveillance camera information that are required for navigation, vehicle maintenance information including a breakdown diagnosis, and a software and a firmware for an operating system of an in-vehicle device.

5. The system according to claim 1, wherein the wireless access point in which a connection is made is the wireless access point nearest to the location of the vehicle or the wireless access point that has a strongest signal strength.

6. The system according to claim 1, wherein the control unit authenticates whether a connection between the wireless communication unit and the wireless access point is a valid connection.

7. A method of updating vehicle information using a wireless access point connected to a telematics server, the method comprising:
   connecting, via a wireless communication unit, to the wireless access point through a Wi-Fi network to automatically receive an update file;
   receiving, by the wireless communication unit, the update file, when the update file regarding the vehicle information is present on the telematics server;
   storing, by a control unit, the received update file;
   updating the vehicle information by using the stored update file; and
   when an error occurs during when the update file is transmitted, requesting that the telematics server resume transmission of the update file from the point at which the error occurred.

8. The method according to claim 7, further comprising:
searching the wireless access point located in a surrounding area.

9. The method according to claim 7, wherein when the vehicle information that needs to be updated is identified, and when the vehicle information that needs to be updated exists, the method further comprises:
sending a request for the update file regarding the identified vehicle information to the telematics server.

10. The method according to claim 7, wherein the vehicle information at least one selected from a group consisting of map data, traffic information, and traffic surveillance camera information that are required for navigation, vehicle maintenance information including a breakdown diagnosis, and a software and a firmware for an operating system of an in-vehicle device.

11. An apparatus for updating vehicle information, the apparatus comprising:
a wireless communication unit configured to connect to a wireless access point to automatically receive one or more update data containers, when one or more update data containers regarding vehicle information are present on a telematics server;
a control unit configured to store the update data container received through the wireless communication unit and control the vehicle information and one or more devices corresponding to the vehicle information; and
an update unit configured to update vehicle information by using one or more received update data containers;
wherein when an error occurs during transmission of the update file, the control unit is configured to send a request to the telematics server to resume transmission of the update file from the point at which the error occurred.

12. The apparatus according to claim 11, wherein the vehicle information includes at least one selected from a group consisting of map data, traffic information, and traffic surveillance camera information that are required for navigation, vehicle maintenance information including a breakdown diagnosis, and a software and a firmware for an operating system of an in-vehicle device.

* * * * *